(12) United States Patent
Sauer et al.

(10) Patent No.: US 9,880,950 B2
(45) Date of Patent: Jan. 30, 2018

(54) DYNAMICALLY ADDRESSABLE MASTER-SLAVE SYSTEM AND METHOD FOR DYNAMICALLY ADDRESSING SLAVE UNITS

(71) Applicant: ebm-papst Mulfingen GmbH & Co. KG, Mulfingen (DE)

(72) Inventors: Thomas Sauer, Bad Mergentheim (DE); Helmut Lipp, Doerzbach-Hohebach (DE); Klaus Teuke, Doerzbach (DE); Markus Humm, Weissbach (DE); Andreas Fessel, Weikersheim (DE); Martin Buerkert, Doerzbach-Hohebach (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 158 days.

(21) Appl. No.: 14/840,151

(22) Filed: Aug. 31, 2015

(65) Prior Publication Data
US 2016/0103773 A1   Apr. 14, 2016

(30) Foreign Application Priority Data

Oct. 10, 2014   (DE) .................. 10 2014 114 720
Dec. 3, 2014    (DE) .................. 10 2014 117 797

(51) Int. Cl.
| | |
|---|---|
| G06F 13/00 | (2006.01) |
| G06F 13/16 | (2006.01) |
| H04L 29/12 | (2006.01) |
| H04L 12/40 | (2006.01) |
| G06F 13/42 | (2006.01) |

(52) U.S. Cl.
CPC .......... *G06F 13/16* (2013.01); *G06F 13/4282* (2013.01); *H04L 12/40169* (2013.01); *H04L 61/2038* (2013.01)

(58) Field of Classification Search
CPC ....................... G06F 13/4282; H04L 61/2038
See application file for complete search history.

(56) References Cited

U.S. PATENT DOCUMENTS

| | | | | |
|---|---|---|---|---|
| 7,882,289 B2 * | 2/2011 | Furuya | ................ | G06F 13/4247 710/106 |
| 2010/0122003 A1 * | 5/2010 | Hu | ........................ | H04B 10/60 710/110 |

* cited by examiner

*Primary Examiner* — Zachary K Huson
(74) *Attorney, Agent, or Firm* — Harness, Dickey & Pierce, P.L.C.

(57) ABSTRACT

A master-slave system includes a master unit having a digital output for providing a signal or a serial signal sequence of signals, and at least two slave units. Each of the slave units includes at least one digital serial memory having a size of one bit, and each slave unit includes an input and an output. The slave units are serially connected to one another via the inputs and the outputs via a signal line (5). The output of a first slave unit is connected via the signal line to the digital output of the master unit. The master slave system is configured so that a signal supplied by the digital output is detected at the input of the slave unit, in order to raise the address of the corresponding slave unit in each case by the value "1", to store the signal change in the memory and to output a signal corresponding to the content of the memory at the output of the memory.

12 Claims, 5 Drawing Sheets

DAus = Dout

Figure 1:
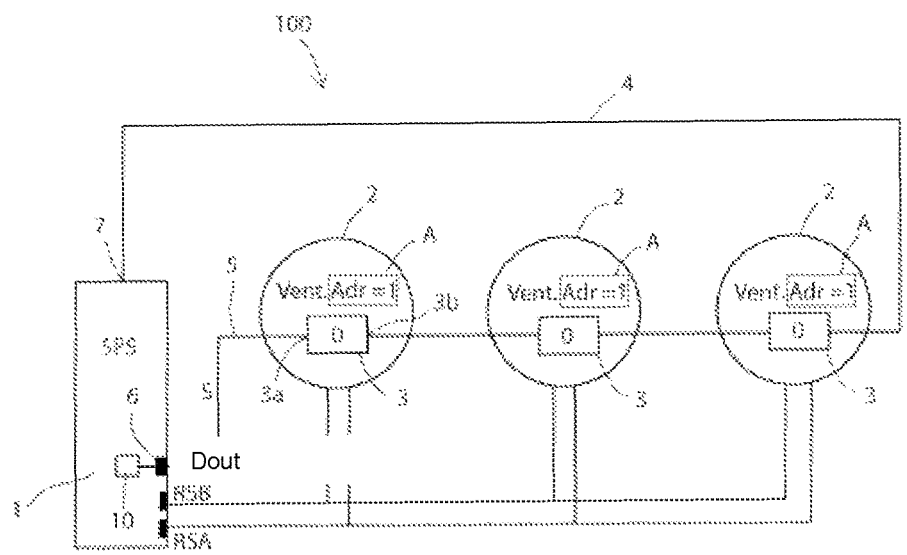

DYNAMICALLY ADDRESSABLE MASTER-SLAVE SYSTEM AND METHOD FOR DYNAMICALLY ADDRESSING SLAVE UNITS

FIELD OF INVENTION

The invention relates to a dynamically addressable master-slave system and a method for dynamically addressing slave units.

BACKGROUND OF INVENTION

A wide variety of bus systems have long been known. The master/slave bus systems underlying the present invention generally have the characteristic that all slaves must have unique addresses in order to be able to be addressed individually. This enables individual slaves to be individually addressed by means of a bus system, wherein via the latter, it is possible to change the settings of the slaves or to retrieve status information from the slave. A wide variety of bus systems such as, for example, master/slave bus systems, have long been known in the prior art.

In many master-slave bus systems, the slave units of the system are individually identifiable and addressable by the master unit. As a result, a master unit is capable, for example, of activating via a specific slave unit a system component controlled by said slave unit, or to assign received messages to a specific slave unit and, therefore, to a specific system component. To ensure such a functionality, the slave unit for one requires an address that is unique system-wide; for another, the unique address as well as the assignment of the slave unit to a system component or its position in the bus system must be known to the master unit.

This is normally achieved, for example, by carrying out an addressing phase or orientation phase during the initializing of a bus system. In this phase, slave units are allocated system addresses, in a specific sequence, for example, or the master unit is given the opportunity to query sequentially stored device identifiers of individual slave units at various positions. For example, an address is assigned manually to the slave units by connecting each of the existing slaves sequentially in a defined sequence individually to the bus system or sequentially releasing them individually for addressing by means of a manually activated switch. Since only one defined, manually selected slave unit is connected to the bus line or released for addressing, the master unit is able to assign a unique address to this individual slave unit by outputting a broadcast command on the bus—directed actually to all slave units depending on the bus system. Based on the defined sequence in which the individual slave units are addressed, the master slave, after assigning the address, also knows the relative position of the individual slave units in the system. However, such manual procedures are not only time-consuming and prone to error due to involvement by a person, but in any case also require a bus architecture.

An automated addressing process is proposed by DE 103 36 301 A1. The addressing process is likewise provided for a master-slave bus system having a bus line, the beginning and end of which are connected to the master unit. In this method, the bus line of the system is interrupted during the course of assigning an address, so that the master unit is forced to address the slave units through a clock input. Furthermore, the method is only applicable for systems that have a circular bus line. The present invention describes such a method of addressing.

Another bus-based method of addressing slave units is known from EP 2 287 689 EP. For this purpose, each of the slave units must have bus interfaces adapted to the bus system used, via which they are connected to one or multiple bus lines of a master slave bus system. Even though this method of addressing is suitable for many bus systems, such as unidirectional or bidirectional, circular and non-circular bus lines, and with any communication protocols, the addressing in each case requires a bus architecture of the master-slave bus system.

To implement the address method and to implement the bus architecture, the solutions known in the prior art require corresponding components, which entails additional costs and requires installation space. Even replacing a system component connected to a slave such as, for example, a fan, requires corresponding measures in order to subsequently configure the address assignment.

Against this background, the object of the present invention is to overcome the aforesaid disadvantages and to provide an improved method for dynamically addressing slave units, as well as a dynamically addressable master-slave system, which is easy to implement and to manipulate.

The basic concept of the present invention is to configure the master-slave system in such a way that at the point in time the addressing of the slave units is initiated, all slave units are initially provided the same address and serial digital memories, preferably shift register memories, which initially all have the value "ZERO".

The addressing may be performed using a number of signals of a signal sequence that corresponds to the number of slave units to be addressed, wherein the signals are supplied, for example, as switching pulses, flank changes, zero currents or also frequency or amplitude modulation procedures by the master unit via a signal line connecting the slave units in series. Of sole relevance in such instance is that with the appropriate signal, it is possible to implement two different states (non-signaled and signaled state).

If a slave unit recognizes a change of the signal at its signal input to the signaled state, the corresponding address of the slave unit is then raised by the value "1", wherein the maximum allowed address is known or inputted to each slave unit, and the address cannot be raised beyond this value.

At the same time, the digital serial memory, i.e., for example, the bit value in the shift register memory, is set to the signaled state. In addition, a signal corresponding to the previous state of the serial memory is output at the output thereof and, thereby, at the output of the relevant slave unit. The signaled state is thus forwarded to the respective next adjacent slave unit via the signal line, in each case time delayed by one period as a result of the serial sequencing of the slave units. The information is therefore always forwarded in each case with each signal change The result of such an inventive configuration is that the address of the slave units of the sequence is raised, beginning with their own address, which ensures that when the addressing procedure is fully implemented, each slave unit is assigned a unique individual address in the master-slave system.

Thus, according to the invention, a master-slave system is proposed, comprising a master unit having a digital output for supplying a signal or a serial signal sequence of signals, and multiple slave units, each of the slave units including a digital serial memory having a size of one bit and each including an input and an output, wherein the slave units are serially connected to one another via the inputs and the outputs via a signal line, and wherein the input of a first slave unit is connected via the signal line to the digital output of the master unit. The master-slave system is configured so that a signal (signal change) of a serial signal sequence supplied by the digital output is detected at the input of the slave unit, in order to raise the address of the corresponding slave unit in each case by the value "1", to store the signal change in the memory and to output a signal corresponding to the content of the memory at the output of the memory. Only positive flank changes are stored, however, (i.e., value of the bit in the shift register can only change from 0 to 1 during the process, but no longer to 0. This is possible only following a renewed initializing of the address assignment mechanism, since then all shift registers are initially set to 0.

The signals of the master unit may, for example, be generated and/or supplied at the digital output of the master unit by a suitable signal-generating module.

According to the invention, it is further provided that the master-slave system is designed so that n slave units (n=number of slave units) are provided, the output of n−1 slave units being connected to the input of the respective adjacent slave unit in the series via the data line.

In one advantageous refinement of the invention, the output of the last slave unit in the serial arrangement is connected to a digital input of the master unit via a return line, thereby forming a ring system.

It is advantageously provided that the master unit is designed as memory-programmable controls, as a computer having corresponding hardware interfaces or not freely programmable controls, or as a unit having a push button for generating the signal.

According to the invention, it is further advantageously provided that the master-slave system may change from a lock mode to an address mode and vice versa, in which the addressing of the slave units is locked or is enabled. In one preferred embodiment of the invention, the master unit is designed to generate an address mode signal $S_a$, in order to set the master-slave system in the address mode, and the address mode signal $S_a$ may be supplied either via the digital output or via an optionally provided bus. Thus, in addition to the address assignment signal line, a bus line may a Iso be provided, which is not required for addressing, however.

In an equally advantageous embodiment of the invention, the master unit is designed to generate a lock mode signal $S_p$, in order to reset the master-slave system in the lock mode after completing the addressing, and the lock mode signal may be supplied at the slave units via the digital output or, alternatively, via an optionally provided bus.

The serial digital memories are preferably designed as shift registers, therefore, as a sequential logic circuit, in which multiple units connected in series quasi shift their memory content with each cycle further by one memory unit (in each case 1 bit).

A second aspect of the present invention relates to a method for dynamically addressing the previously described slave units of a master-slave system, wherein at the onset of addressing, all slave units have the same address and the content of all digital serial memories is the value "zero", the method comprising the following steps:
a) Setting the master-slave system in the address mode by means of an address mode signal $S_a$ supplied by the master unit,
b) Generating a number of serial signals (n pulses), which corresponds to the number of slave units (n slave units) and transmitting the signals over the signal line by means of the master unit,
c) Raising the slave address of the slave unit addressed by the signal, in each case by the value "1", as soon as a signal corresponding to the change of state is detected at the input to the slave unit, and setting the respective serial memory to the signaled state and forwarding a corresponding signal at the output of the corresponding slave unit and, therefore, to the input of the respective nearest adjacent slave unit,
d) Returning from the signaled to the non-signaled state after each signal of the serial signal sequence of signals.

Since n signal changes take place, the result is, therefore, n+2 states (clocks) and the value of the address per signal change is raised, so that the first slave unit is raised n−1 times by the value "1", the second slave unit by n−2 times and so forth.

The method may also be advantageously carried out in such a way that instead of n signals, the master unit generates n+1 signals, and thus generates one additional signal change beyond the number of slave units, such that the last slave unit in the series, after being addressed, is raised at its output by one additional address unit as a result of the additional signal change, and loops back one signal change, preferably via a return line to the input of the master unit, wherein the master unit detects the conclusion of the addressing procedure.

In this case, n+1 signal changes take place, and the result, therefore, is 2n+2 states (clocks) and the value of the address per signal change is raised, so that the first slave unit is raised n times by the value "1", the second slave unit by n−1 times and so forth.

If a return line is used, the master then generates one additional signal change more than is needed for the actual address assignment. The result of this is that the last slave, after its addressing, which is raised by one additional address unit as a result of the additional signal change, generates at its output a signal change of the return line 4, which the master is able to recognize. The master, when it recognizes a flank change at its input 7, knows that all slaves have been correctly addressed. If the master is merely a push button, a suitable signaling unit such as, for example, an LED could be connected to the return line and, when outputting the signal, when the LED briefly lights up, could inform the operator of the push button that all slave units have been correctly addressed.

As an alternative to the return line, the number of existing slave units may be transferred to an intelligent master, such as an MPC, a PC or a not freely programmable control. It would then generate only the number of flank changes required for this number. A checking for correct performance of the address assignment in this case would then have to occur elsewhere, for example, by means of suitable queries on the bus.

To signal the ending of the address assignment, the master sends an appropriate signal, which cannot be confused with the normal signal transition. The signal in this case may either be sent over the signal line or, alternatively, an appropriate bus command may be sent to the slave units.

As an alternative design of the master-slave system and of the method, the digital output of the master unit and the digital line between the master unit from the digital output to the input of the first slave unit may be omitted. For this, the master unit must know the address of the serial number of the first slave unit. The master unit is then able to send suitable bus telegrams, to which only the slave with the unique serial number responds, which telegrams replace the signal changes that are normally transmitted by the signal to the first slave unit via the digital output.

The methods described are implemented so that the signaled state of the slave unit is forwarded to the next slave unit in the series, in each case delayed by one period as a result of its serial sequencing.

The method may also be advantageously designed so that a maximum time span $t_{max}$ is defined for the entire addressing process, which in each case may elapse between two signal changes, wherein a termination of the address assignment and the resetting of the memory values and address values to the output value occurs as soon as the time span $t_{max}$ during a signal change is exceeded.

Figure 2:
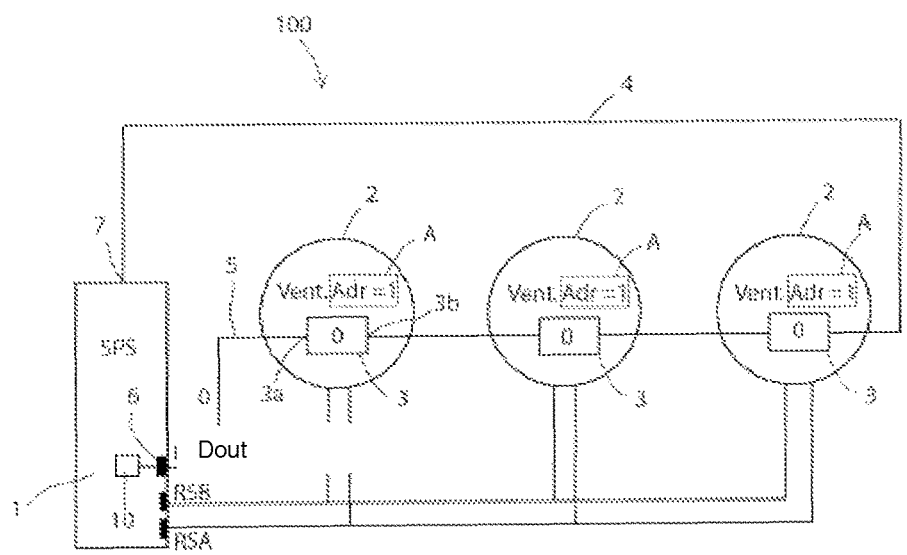
Figure 3:
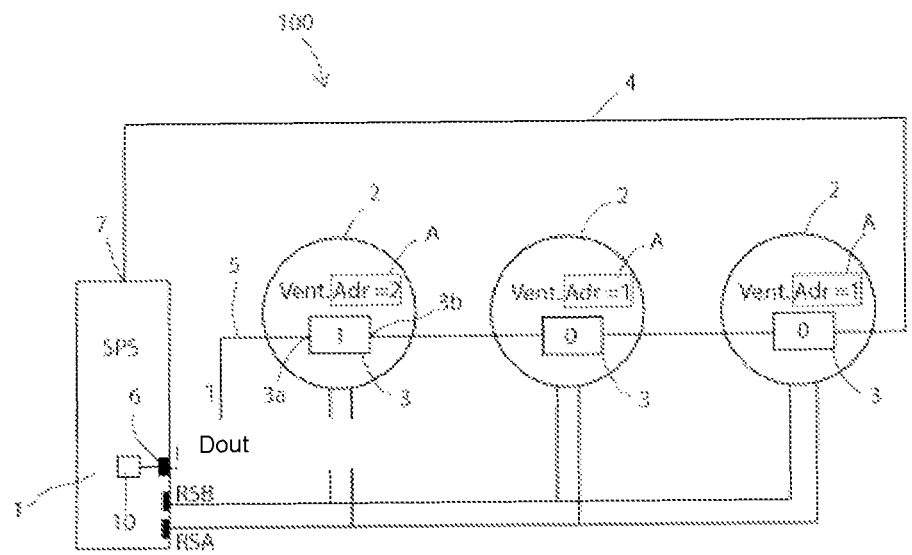
Figure 4:
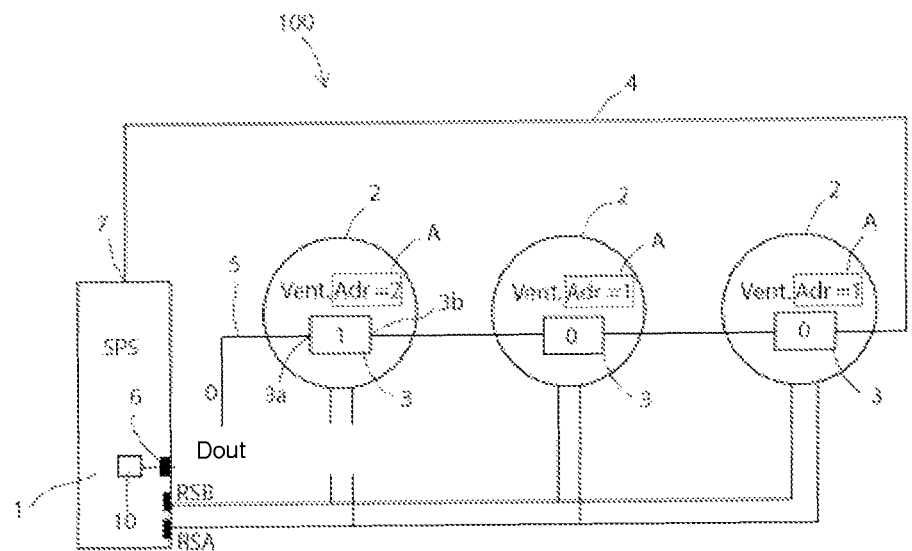
Figure 5:
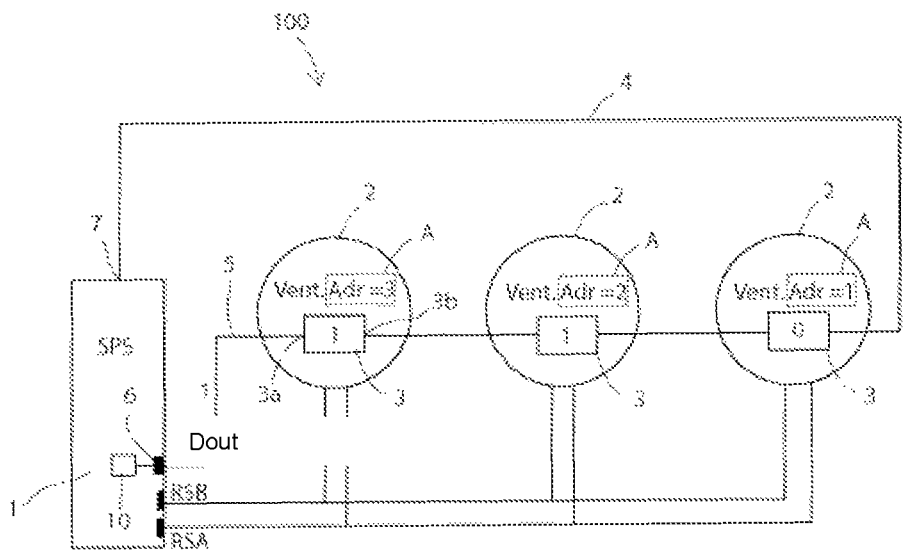
Figure 6:
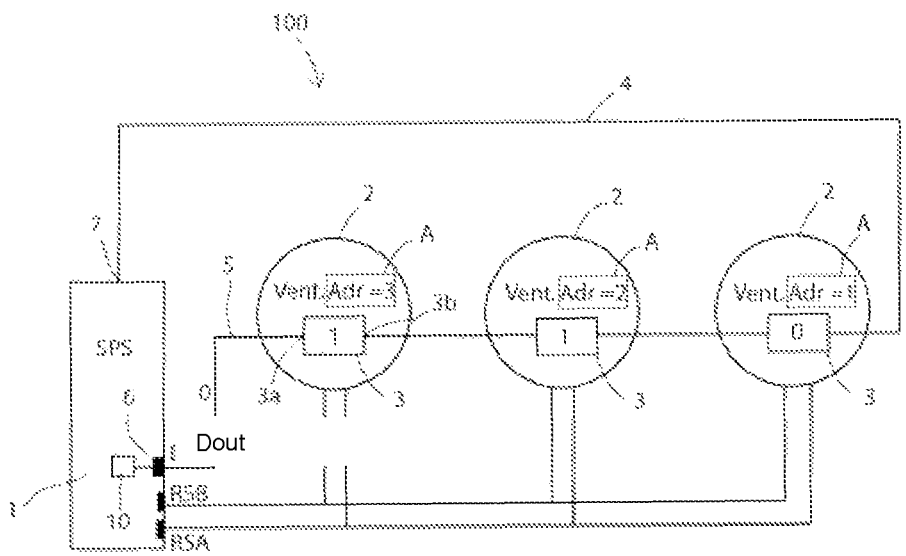
Figure 7:
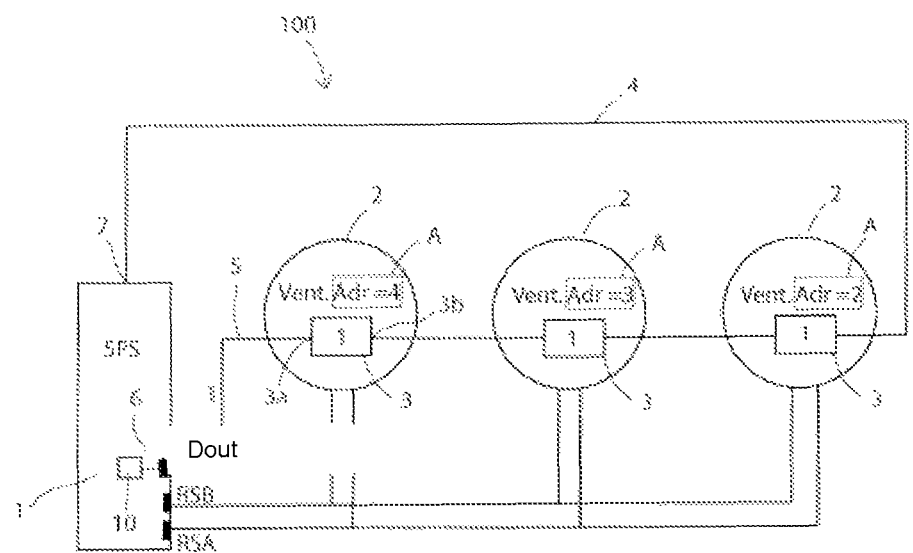
Figure 8:
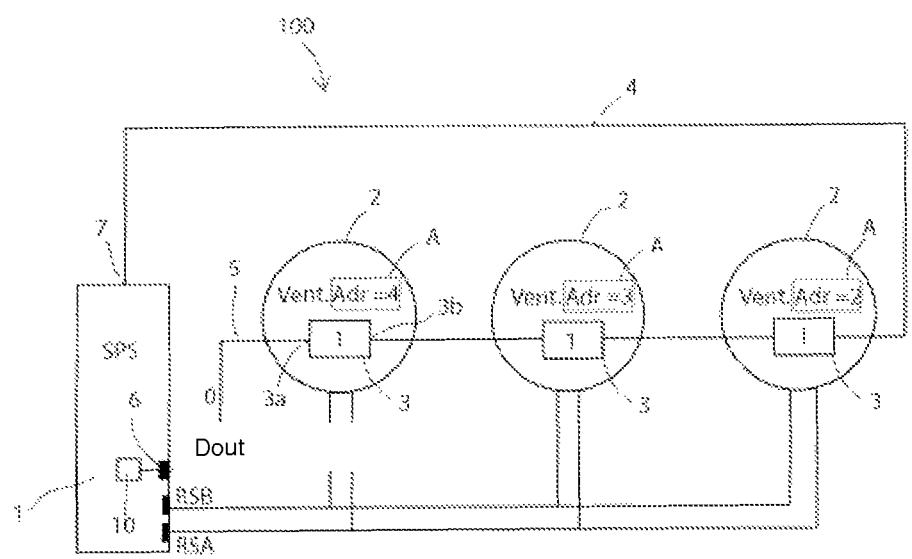
Figure 9:
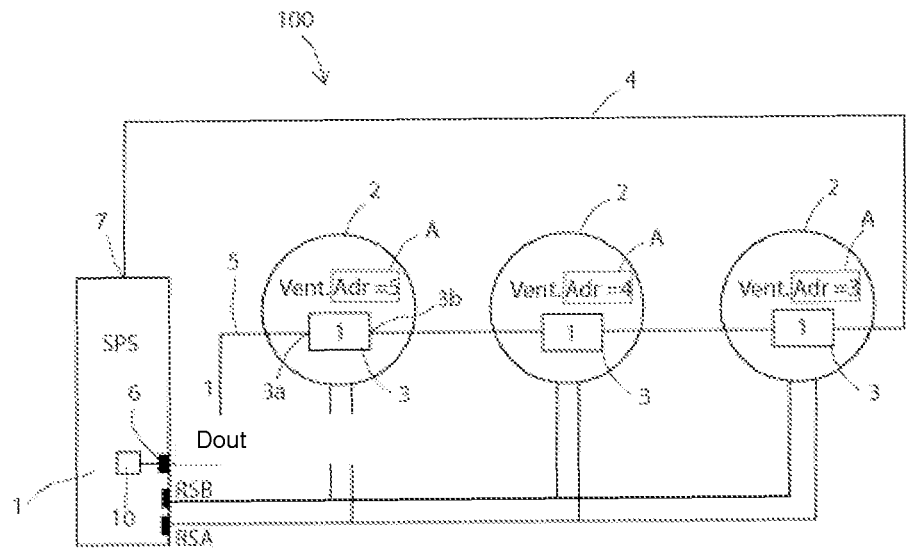
Figure 10:
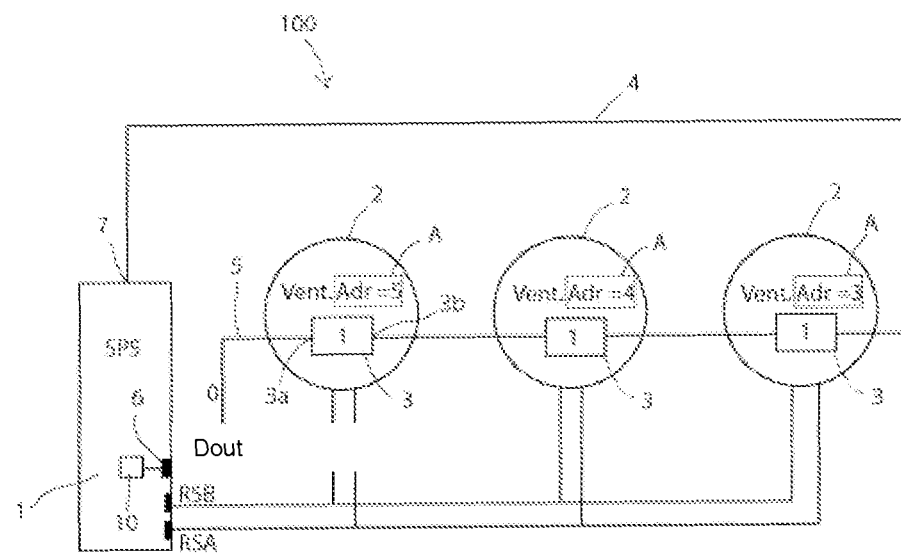

The figures disclose additional features of the invention, in which:

FIG. 1 shows multiple slave units, each of which include a digital serial memory having a size of one bit, FIG. 2 shows an address assignment using a shift register in the start state, FIG. 3 shows an address assignment using a shift register with the state in the first clock, FIG. 4 shows an address assignment using a shift register with the state after the first clock, FIG. 5 shows an address assignment using a shift register with the state in the second clock, FIG. 6 shows an address assignment using a shift register with the state after the second clock, FIG. 7 shows an address assignment using a shift register with the state in the third clock, FIG. 8 shows an address assignment using a shift register with the state after the third clock, FIG. 9 shows an address assignment using a shift register with the state in the fourth clock, FIG. 10 shows an address assignment using a shift register with the state after the fourth clock.

FIG. 1 shows an exemplary embodiment of a master-slave system 100 according to the invention. The master-slave system 100 comprises a master unit 1 having a digital output 6 and a module 10 for supplying a signal sequence of signals S. Also provided are three exemplary slave units 2, the slave units 2 each including a digital serial memory 3 having a size of one bit. In addition, the slave units 2 each include an input 3a and an output 3b.

As is further apparent in the figures, the slave units 2 are serially connected to one another via the inputs 3a and the outputs 3b via a signal line 5, the input 3a of the first slave unit 2 being connected via the signal line 5 to the digital output 6 of the master unit 1. The output of the last slave unit 2 in the present exemplary embodiment is connected to a digital input 7 of the master unit 1 and, together with the return line 4 and the signal line 5, forms a ring structure.

The master unit 1 used here is a memory programmable control (MPC). The slave units 2 may, for example, be associated with fans. Optionally, bus lines RSA and RSB extend to the slave units 2.

In the present embodiment, 3 slave units 2 are present, so that 4 (n=3+1) signal changes occur, which are depicted sequentially in the FIGS. 3 through 10. The result is, accordingly, 2n+2, thus 8 states (clocks), wherein the value of the address A per signal change is raised by the value "1", including up to the last signal change, which is looped back to the digital input 7 of the MPC control.

The master-slave system 100 is configured so that a signal (signal change) of a serial signal sequence supplied by the digital output 6 is detected at the input 3a of the slave unit 2, and as a result of which the address A of the corresponding slave unit 2 is raised in each case by the value "1". This means, in other words, that as soon as a signal change is recognized at the input of the memory 3, a signal corresponding to the content of the memory is output at the output of the memory, and the content of the memory is set to the value corresponding to the signal at the input. Only the positive flank changes are stored, however, as previously explained.

For purposes of addressing, the master-slave system 100 is set in the address mode by means of an address mode signal $S_a$ supplied by the master unit 1, as was previously described.

FIG. 2 depicts the output state (start state) of the master-slave system 100. At the point in time addressing is initiated, all slave units 2 have the same address A with the depicted value=1 (one) and all serial memories 3 contain the value=0 (zero).

FIG. 3 shows the address assignment via the memories 3, which operate as shift registers. The signal change is stored in the memory 3 and a signal corresponding to the content of the memory 3 is output at the output 3b of the memory 3 and, therefore, at the input 3a of the next slave unit 2 in the series. The address A of the first slave unit 2 has increased by the value "1" to 2, the next two slave units in the series still have the address value 1.

FIG. 4 shows the state after the first clock. After the signal change, there is a return to the non-signaled state, which is depicted with the value "0" on the signal line 5.

In FIGS. 5 and 6, respectively, 7 and 8, the previously described process is repeated. The signaled state is forwarded to the next slave unit 2, in each case delayed by one period due to the serial sequencing of the slave units 2. The result of this is that the slave units first start in order with the raising of their own address, which ensures that when the procedure is fully completed, each slave has a unique individual address. Thus, the information is always forwarded in each case in conjunction with each signal change. As previously described, an additional signal change is initiated, once all three slave units 2 of the master-slave system 100 have been addressed, and have the addresses A=4, 3, 2 in that order. The state in the fourth clock is depicted in FIG. 10 and the state after the fourth clock is depicted in FIG. 11. The last signal change, (signal pulse) is given by the MPC control 1 via the return line of the signal line 5 to the MPC control 1, as a result of which the addresses A are raised in each case by the value "1" and the MPC control 1 detects that the addressing is concluded.

For the entire process, a maximum time span is defined which may fall between two signal changes. If said time span is exceeded, all slave units 2 interpret this as a termination of the address assignment and reset their serial memories 3, as well as their own slave address A to the respective output value.

The invention is not limited in its implementation to the previously specified preferred embodiments. Rather, a number of variants are conceivable, which make use of the solution depicted, even in the case of fundamentally differing implementations. All disclosed features may be used in any combination to the extent technically possible.

The invention claimed is:
1. A master-slave system comprising:
a master unit having a digital output for supplying a serial signal sequence of signals, and
at least two slave units, wherein
each of the slave units includes at least one digital serial memory having a size of one bit, and each slave unit includes an input and an output,
the slave units are serially connected to one another via the inputs and the outputs via a signal line,
the input of a first slave unit is connected via the signal line to the digital output of the master unit, the master slave system is configured so that a signal change of the serial sequence of signals supplied by the digital output is detected at the input of a first slave unit;

in reaction to the signal change, the master slave system is configured to raise the address of the corresponding slave unit in each case by the value "1", to store the signal change in the memory, wherein only a positive change of flank is stored, and to output a signal corresponding to the content of the memory at the output of the respective slave-unit and thus at the input of the next slave-unit.

2. The master-slave system according to claim 1, wherein n slave units are provided, wherein the output of n−1 slave units is connected to the input of the respective next adjacent slave unit in the series.

3. The master-slave system according to claim 1, wherein the output of the last slave unit in the serial arrangement is connected to a digital input of the master unit via a return line.

4. The master-slave system according to claim 1, wherein the master unit is designed as a memory-programmable control, a computer having corresponding hardware interfaces or not freely programmable control or as a unit having a push button for generating the signal.

5. The master-slave system according to claim 1, wherein the master-slave system may switch from a lock mode to an address mode and vice versa, in which the addressing of the slave units is either locked or enabled.

6. The master-slave system according to claim 5, wherein the master unit is designed for generating an address mode signal, in order to set the master-slave system in the address mode, and the address mode signal may be supplied via the digital output or via an optionally provided bus.

7. The master-slave system according to claim 5, wherein the master unit is designed for generating a lock mode signal, in order to reset the master-slave system in the lock mode when the addressing has ended, and the lock mode signal may be supplied via the digital output or via an optionally provided bus.

8. The master-slave system according to claim 1, wherein the serial digital memories are designed as shift registers.

9. A method for dynamically addressing slave units of a master-slave system according to claim 1, wherein at the start of addressing, all slave units have the same address, and the content of all digital serial memories is the value "zero", the method comprising:

setting the master-slave system in an address mode by means of an address mode signal supplied by the master unit, generating a number of serial signals, which corresponds to the number of slave units and transmitting the signals over the signal line by means of the master unit, raising a slave address of the slave unit addressed by each signal, in each case by the value "1" in reaction to when a signal change of the serial sequence of signals corresponding to the change of state is detected at the input to the slave unit, and setting the respective serial memory to the signaled state, wherein only a positive change of flank is stored, and forwarding a corresponding signal at the output of the corresponding slave unit and, therefore, to the input of the respective nearest adjacent slave unit, returning from a signaled to a non-signaled state after each signal of the serial signal sequence of signals.

10. The method according to claim 9, wherein the signaled state of the slave unit is forwarded to the next slave unit in the series, in each case delayed by one period as a result of its serial sequencing.

11. The method according to claim 9, wherein a maximum time span is defined for the entire process, which in each case may elapse between two signal changes, wherein a termination of the address assignment and the resetting of the memory values and address values to the output value occurs as soon as the time span during a signal change is exceeded.

12. The method according to claim 9, wherein the master unit generates one additional signal change beyond the number of slave units, such that the last slave unit in the series, after being addressed, is raised at its output by one additional address unit as a result of the additional signal change, via a return line at the input of the master unit, wherein the master unit detects the conclusion of the addressing process.

* * * * *